US008422099B2

(12) United States Patent
Murayama et al.

(10) Patent No.: US 8,422,099 B2
(45) Date of Patent: Apr. 16, 2013

(54) IMAGE FORMING APPARATUS

(75) Inventors: Kentaro Murayama, Kasugai (JP); Tetsuya Okano, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 508 days.

(21) Appl. No.: 12/728,117

(22) Filed: Mar. 19, 2010

(65) Prior Publication Data

US 2010/0245945 A1 Sep. 30, 2010

(30) Foreign Application Priority Data

Mar. 27, 2009 (JP) ................................ 2009-079472

(51) Int. Cl.
*H04N 1/04* (2006.01)

(52) U.S. Cl.
USPC ........... 358/498; 358/474; 358/496; 399/299; 399/405

(58) Field of Classification Search .................. 358/498, 358/496, 474; 399/299, 66, 82, 159, 405, 399/401, 167
See application file for complete search history.

(56) References Cited

U.S. PATENT DOCUMENTS

| | | | | |
|---|---|---|---|---|
| 5,117,266 | A * | 5/1992 | Takemura et al. | 399/373 |
| 5,365,324 | A | 11/1994 | Gu et al. | |
| 6,173,141 | B1 | 1/2001 | Sakagami et al. | |
| 6,556,802 | B2 * | 4/2003 | Sasamoto et al. | 399/299 |
| 6,941,102 | B2 * | 9/2005 | Sasamoto et al. | 399/299 |
| 7,327,972 | B2 * | 2/2008 | Matsuda et al. | 399/162 |
| 7,684,728 | B2 * | 3/2010 | Okabe et al. | 399/111 |
| 7,787,813 | B2 * | 8/2010 | Okaji | 399/316 |
| 7,820,352 | B2 * | 10/2010 | Yamazaki et al. | 430/124.1 |
| 8,213,846 | B2 * | 7/2012 | Saito | 399/302 |
| 8,260,181 | B2 * | 9/2012 | Murayama | 399/302 |
| 8,310,734 | B2 * | 11/2012 | Murayama | 358/474 |
| 2005/0249523 | A1 | 11/2005 | Shibuya et al. | |

(Continued)

FOREIGN PATENT DOCUMENTS

| | | | |
|---|---|---|---|
| EP | 0855627 | A2 | 7/1998 |
| JP | S64-072176 | A | 3/1989 |

(Continued)

OTHER PUBLICATIONS

Japan Patent Office, Notification of Reasons for Refusal for Japanese Patent Application No. 2009-079472 (counterpart to above-captioned patent application), dispatched Apr. 7, 2011.

(Continued)

*Primary Examiner* — Negussie Worku
(74) *Attorney, Agent, or Firm* — Baker Botts L.L.P.

(57) ABSTRACT

An image forming apparatus includes: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body; and a control unit that controls driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies moves to a normal rotation state from a stopped state.

17 Claims, 11 Drawing Sheets

U.S. PATENT DOCUMENTS

| | | | | |
|---|---|---|---|---|
| 2005/0271418 | A1 | 12/2005 | Kojima | |
| 2006/0067732 | A1 | 3/2006 | Igarashi | |
| 2006/0079358 | A1 | 4/2006 | Igarashi | |
| 2007/0110486 | A1* | 5/2007 | Okaji | 399/316 |

FOREIGN PATENT DOCUMENTS

| | | | |
|---|---|---|---|
| JP | H11-065222 | A | 3/1999 |
| JP | H11-327403 | A | 11/1999 |
| JP | 2000-275987 | A | 10/2000 |
| JP | 2001-339978 | A | 12/2001 |
| JP | 2003-091128 | A | 3/2003 |
| JP | 2003-107974 | A | 4/2003 |
| JP | 2004-117644 | A | 4/2004 |
| JP | 2006-018241 | A | 1/2006 |
| JP | 2006-243059 | A | 9/2006 |
| JP | 2006-267620 | A | 10/2006 |
| JP | 2007-025215 | A | 2/2007 |
| JP | 2007-057652 | A | 3/2007 |

OTHER PUBLICATIONS

European Patent Office, Extended European Search Report for Application No. 10002892.7, dated Jul. 14, 2010. (Counterpart to above-captioned patent application.

* cited by examiner

IMAGE FORMING APPARATUS

CROSS REFERENCE TO RELATED APPLICATION

The present application claims priority from Japanese Patent Application No. 2009-079472, which was filed on Mar. 27, 2009, the disclosure of which is herein incorporated by reference in its entirety.

TECHNICAL FIELD

Apparatuses and devices consistent with the present invention relate to an image forming apparatus, and more particularly, to an image forming apparatus having a structure in which an image carrier unit is positioned with respect to an apparatus body.

BACKGROUND

There is a related art image forming apparatus that includes a belt unit (image carrier unit) for conveying a sheet. The belt unit includes a belt stretched between a plurality of rollers, and a frame where the respective rollers are rotatably supported. The frame of the belt unit is pushed against a positioning part, which is provided at an apparatus body, by, for example, a spring member, so that the belt unit is positioned with respect to the apparatus body.

Further, one of the rollers of the belt unit is rotated by a driving force of a belt drive gear that is provided in the apparatus body, and the belt is rotationally driven by the rotation of the roller. Furthermore, photosensitive drums that carry toner images to be transferred to a sheet, a cleaning roller that cleans the belt are provided in the apparatus body while coming into contact with the belt.

SUMMARY

In the image forming apparatus, a plurality of rotating bodies, such as the belt drive gear, the photosensitive drums, and the cleaning roller, is rotationally driven during the formation of an image. In this case, the plurality of rotating bodies applies forces to the belt unit. The direction and magnitude of the force, which is applied from each of the rotating bodies, vary depending on the rotational direction of the rotating body and the relative speed with respect to the belt.

Here, if a resultant force of the forces, which are applied to the belt unit from the respective rotating bodies, is applied in a reverse direction opposite to a direction (positioning direction) where the frame is abutted against the positioning part, there is a possibility that the positioning of the belt unit becomes unstable. That is, even though the belt unit is pushed in the positioning direction by the spring member as described above, the belt unit is moved by a small impact if the resultant force is applied in the reverse direction. Therefore, there is a concern that the formation of an image is negatively affected.

The invention has been made in consideration of the above-mentioned circumstances, and an object of the invention is to provide an image forming apparatus that can further stabilize the positioning of an image carrier unit.

According to an illustrative aspect of the present invention, there is provided an image forming apparatus comprising: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body, are rotationally driven independently of each other, and apply forces to the image carrier unit, the forces being based on rotations of the rotating bodies; and a control unit that controls driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies moves to a normal rotation state from a stopped state.

According to another illustrative aspect of the present invention, there is provided an image forming apparatus comprising: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body, are rotationally driven independently of each other, and apply forces to the image carrier unit, the forces being based on rotations of the rotating bodies; and a control unit that controls driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies move to a stopped state from a normal rotation state.

According to another aspect of the present invention, there is provided an image forming apparatus comprising: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body, are rotationally driven independently of each other, and apply forces to the image carrier unit, the forces being based on the rotations of the rotating bodies; and a control unit that controls the driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies are made to be in a normal rotation state and image is carried on the image carrier.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

An embodiment of the invention will be described below with reference to FIGS. 1 to 11.

(Entire Structure of Printer)

Figure 1:
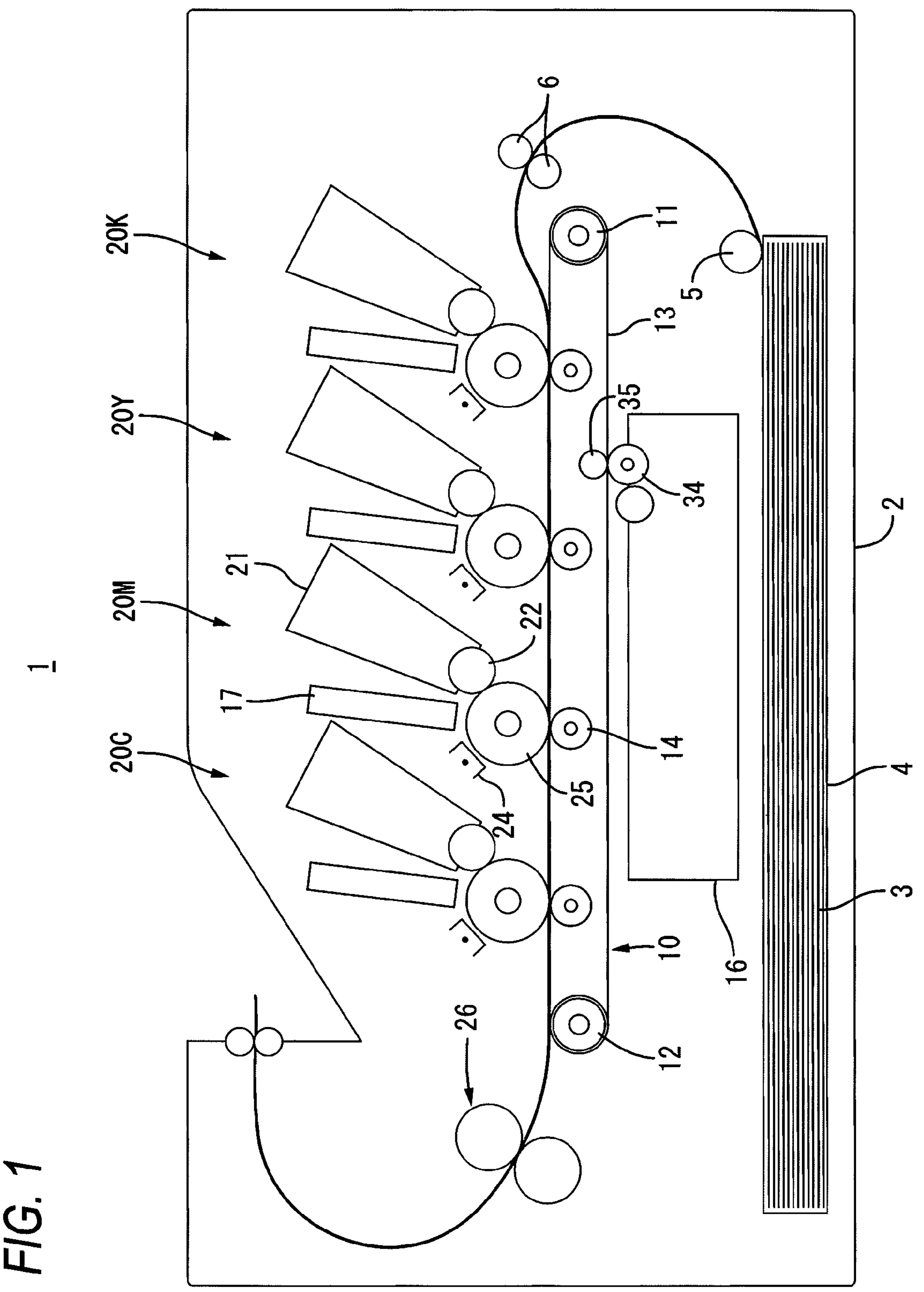
FIG. 1 is a side cross-sectional view showing a state where all developing rollers are in press contact with photosensitive drums in a printer according to an embodiment of the invention.
Figure 2:
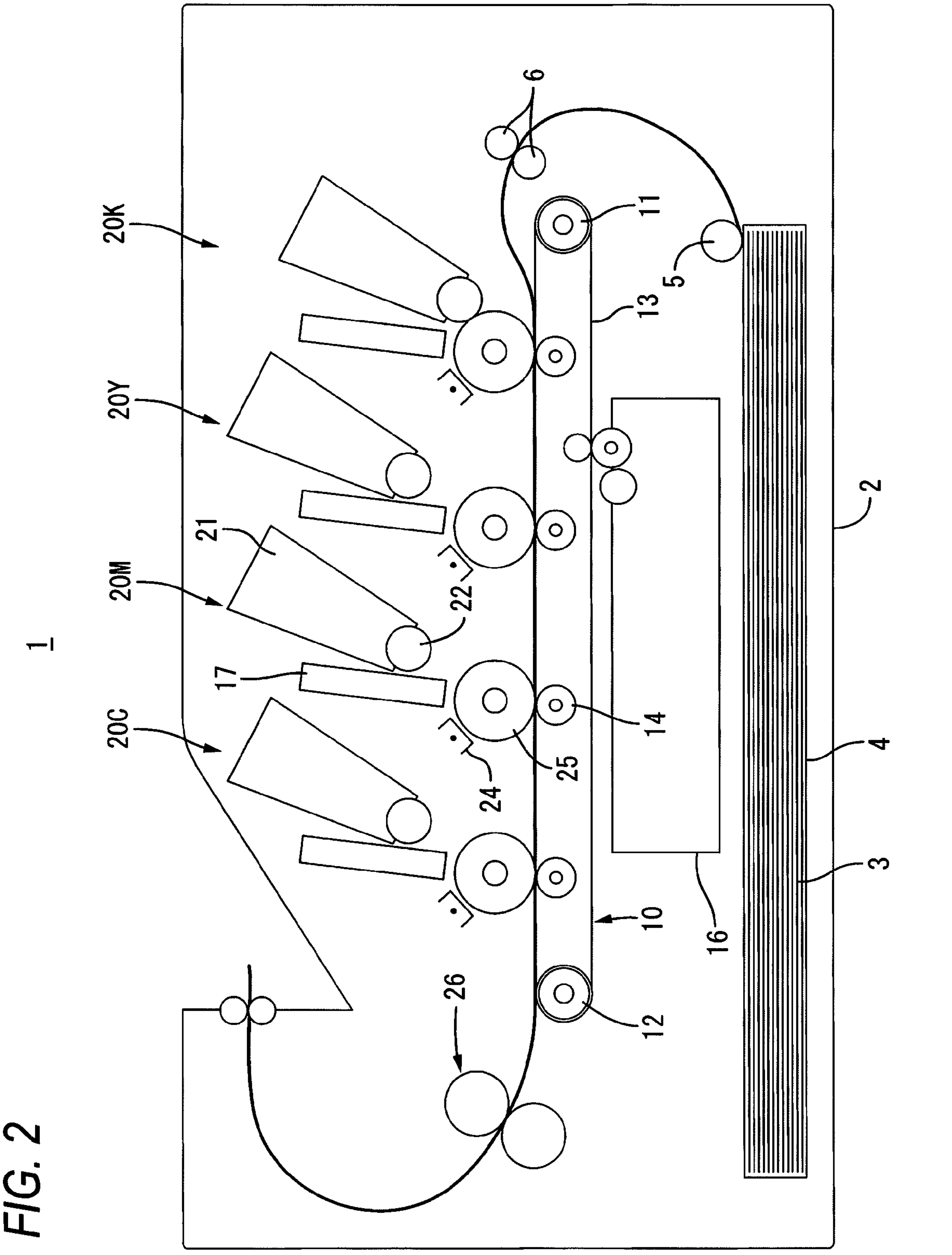
FIG. 2 is a side cross-sectional view showing a state where a part of the developing rollers are separated from the photosensitive drums in the printer.

FIGS. 1 and 2 are side cross-sectional views showing the schematic structure of a printer 1 that is an example of an image forming apparatus according to the embodiment of the invention. FIG. 1 shows a state where all developing rollers 22 are in press contact with photosensitive drums 25, and FIG. 2 shows a state where a part of the developing rollers 22 are separated from the photosensitive drums 25. Meanwhile, the following description, a right side in FIGS. 1 to 3 and 7 is referred to as the front. Further, reference numerals of the same components corresponding to different colors are appropriately omitted in each of the drawings.

The printer 1 according to this embodiment is a so-called direct transfer tandem color printer. As shown in FIG. 1, the printer 1 includes a feed tray 4 which is disposed at a bottom of an apparatus body 2 and in which a plurality of sheets 3 may be loaded. The sheets 3 loaded in the feed tray 4 are fed one by one by a feed roller 5, and are conveyed onto a belt unit 10 by resist rollers 6.

The belt unit 10 (an example of an image carrier unit) has a structure where an annular belt 13 (an example of an image carrier) is stretched between a belt support roller 11 disposed on the front side and a belt drive roller 12 disposed on the rear side. The belt 13 is made of polycarbonate or the like, and the outer surface of the belt is processed into a mirror surface. When the belt drive roller 12 is rotationally driven, the belt 13 is rotated in a counterclockwise direction in the drawings, and a sheet 3 which is electrostatically attracted to an upper surface of the belt 13 is conveyed to the rear side. Transfer rollers 14 are disposed within the belt 13 at positions facing photosensitive drums 25 of respective process units 20K to 20C so that the belt 13 is interposed between the transfer rollers and the photosensitive drums. Further, a belt cleaner 16, which collects toner, paper powder, and the like adhering to the surface of the belt 13, is provided below the belt unit 10. Meanwhile, a structure around the belt unit 10 will be described in detail below.

Four exposure parts 17 and four process units 20K to 20C are lined up in a front-and-rear direction above the belt unit 10. The light emission of each of the exposure parts 17 is controlled on the basis of image data, and each of the exposure parts irradiates the surface of the corresponding photosensitive drum 25 with light for each line.

The process units 20K, 20Y, 20M, and 20C are provided so as to correspond to black, yellow, magenta, cyan colors, respectively. Each of the process units 20K to 20C includes a developing cartridge 21, a charger 24, a photosensitive drum 25 (an example of a parallel rotating body, a rotating body), and the like. The developing cartridge 21 stores toner therein, and includes a developing roller 22 (an example of a movable member) at a lower portion thereof. Each of the developing cartridges 21 is displaced between a development position and a separation position by a developing separating mechanism 60 (see FIG. 4). At the development position, the developing roller 22 is abutted against the photosensitive drum 25 as shown in FIG. 1. At the separation position, the developing roller 22 is separated from the photosensitive drum 25 similar to the other developing cartridges except for the black developing cartridge 21 of FIG. 2. Meanwhile, the other developing cartridges 21 except for the black developing cartridge are positioned at the separation position as shown in FIG. 2 during monochromatic printing, so that the developing rollers 22 are not driven. As a result, it may be possible to increase the life of the developing cartridge 21 or the photosensitive drum 25.

The surface of the photosensitive drum 25 is charged with electricity by the charger 24 and the charged portion of the photosensitive drum is exposed to the light emitted from the exposure part 17, so that an electrostatic latent image is formed. Then, by the supplying of toner from the developing roller 22 to the electrostatic latent image, a toner image is formed on the photosensitive drum 25. The toner images formed on the respective photosensitive drums 25 are sequentially transferred to the sheet 3 by transfer voltages applied to the transfer rollers 14 while the sheet 3 attracted to the belt 13 passes through transfer positions between the photosensitive drums 25 and the transfer rollers 14. After the toner images transferred to the sheet 3 are thermally fixed to the sheet by a fixer 26, the sheet is discharged to the upper surface of the apparatus body 2.

(Detailed Structure Around Belt Unit)

Figure 3:
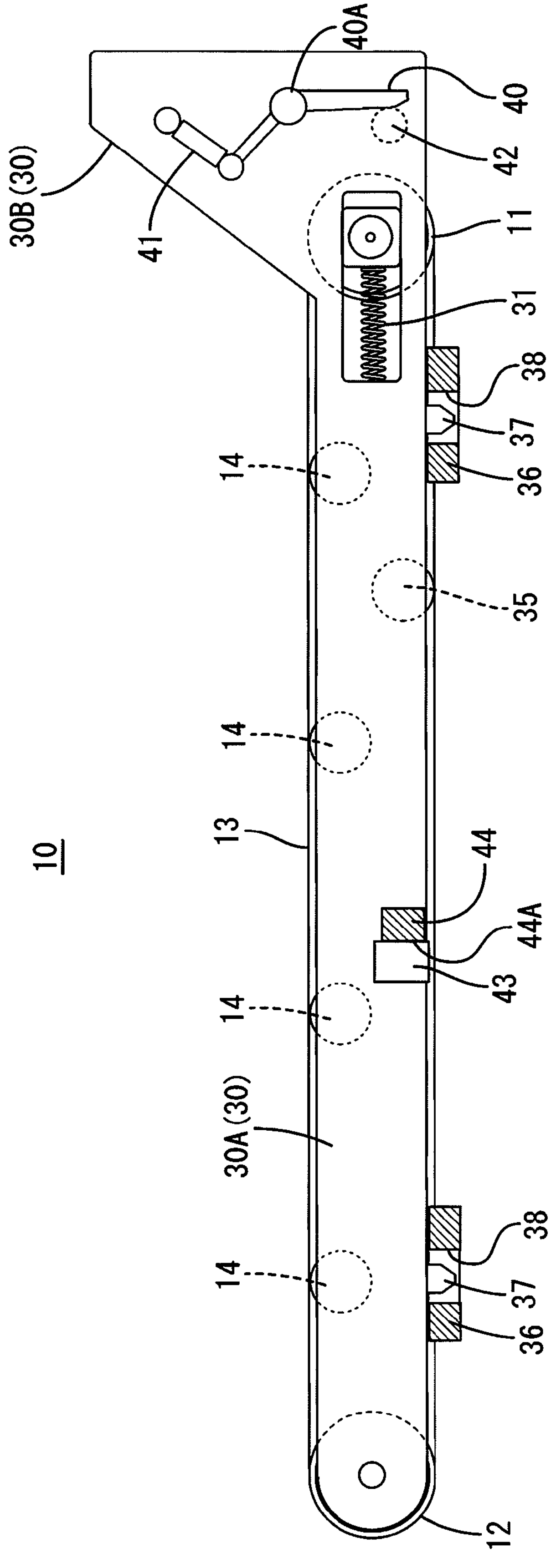
FIG. 3 is a side view of a belt unit.

FIG. 3 is a side view of the belt unit 10.

As shown in FIG. 3, the belt unit 10 includes a frame 30 (an example of a support). The frame 30 includes a pair of side walls 30A that is elongated in the front-and-rear direction and a connecting part 30B that connects front end portions of both the side walls 30A like a bridge, and is formed in the shape of a gate. Both end portions of the above-mentioned belt drive roller 12 are supported by rear end portions of both the side walls 30A. The belt drive roller 12 is rotationally driven by a belt drive gear 33 (see FIG. 7, an example of a drive gear, a normal rotating body, a rotating body) that is provided at the apparatus body 2. Further, both end portions of the belt support roller 11 are supported in the vicinity of the front ends of both the side walls 30A so as to be movable in the front-and-rear direction. Both the end portions of the belt support roller are pushed forward by a spring member 31, so that a tension is applied to the belt 13. Furthermore, the respective transfer rollers 14, which are disposed within the belt 13, are pushed up by spring members (not shown), and the belt 13 is interposed between the photosensitive drums 25 and the transfer rollers with a predetermined pressure.

As shown in FIG. 1, the belt cleaner 16, which is disposed below the belt unit 10, includes a cleaning roller 34 (an example of a reverse rotating body, a rotating body) that comes into contact with the lower surface of the belt 13. The belt unit 10 includes a backup roller 35 that is positioned on the cleaning roller 34 and pushed down, and the belt 13 is interposed between the backup roller 35 and the cleaning roller 34 with a predetermined pressure. Further, the cleaning roller 34 is rotationally driven in a direction opposite to the moving direction of the belt 13 and a predetermined bias is applied between the cleaning roller 34 and the backup roller 35, so that toner and the like adhering to the belt 13 is electrically attracted to the cleaning roller 34 and collected.

When a cover (not shown) provided at an upper portion of the apparatus body 2 is opened and all of the process units 20K to 20C are removed, the belt unit 10 may be detached from the apparatus body 2. A pair of (front and rear) placement parts 36 is provided at the apparatus body 2 on each of the left and right sides of the belt unit 10, and the upper surfaces of the placement parts are formed of horizontal surfaces at a predetermined height. Both the side walls 30A of the frame 30 are placed on the upper surfaces of the placement parts 36, so that the belt unit 10 is positioned in an up-and-down direction.

Further, a pair of (front and) locking protrusions 37 is provided on each of the side walls 30A of the frame 30 so as to protrude downward. Meanwhile, a locking groove 38, which is elongated in the front-and-rear direction, is formed on each of the placement parts 36, and the locking protrusions 37 are engaged with the locking grooves 38 so as to be substantially tightened in a left-and-right direction, respectively. Accordingly, the frame 30 is positioned in the left-and-right direction. Meanwhile, the locking protrusions 37 are engaged with the locking grooves 38 so as not to be tightened in the front-and-rear direction.

Furthermore, a lever 40 is mounted on the front end portion of one side wall 30A of the frame 30. The lever 40 is rotatable about a lever shaft 40A, and is pushed with respect to the frame 30 in a clockwise direction in the drawing by a pushing force of a lever push spring 41 (an example of a pushing unit), which is mounted at one end portion of the lever, in a tensile direction. The other end portion of the lever 40 presses a pressed part 42, which is fixed to the apparatus body 2, toward the rear side by the pushing force. Accordingly, the frame 30 of the belt unit 10 receives a reaction force of the force of the lever 40, which presses the pressed part 42 by the pushing force of the lever push spring 41, through the lever shaft 40A. As a result, the frame is pushed forward with respect to the apparatus body 2.

Further, a protruding portion 43 is formed on the side wall 30A of the frame 30. The protruding portion 43 is abutted against a rear surface 44A of a positioning part 44 that is formed at the apparatus body 2 by the reaction force that is applied to the frame 30 from the pressed part 42. Accordingly, the belt unit 10 is positioned in the front-and-rear direction.

(Electrical Structure of Printer)

Figure 4:
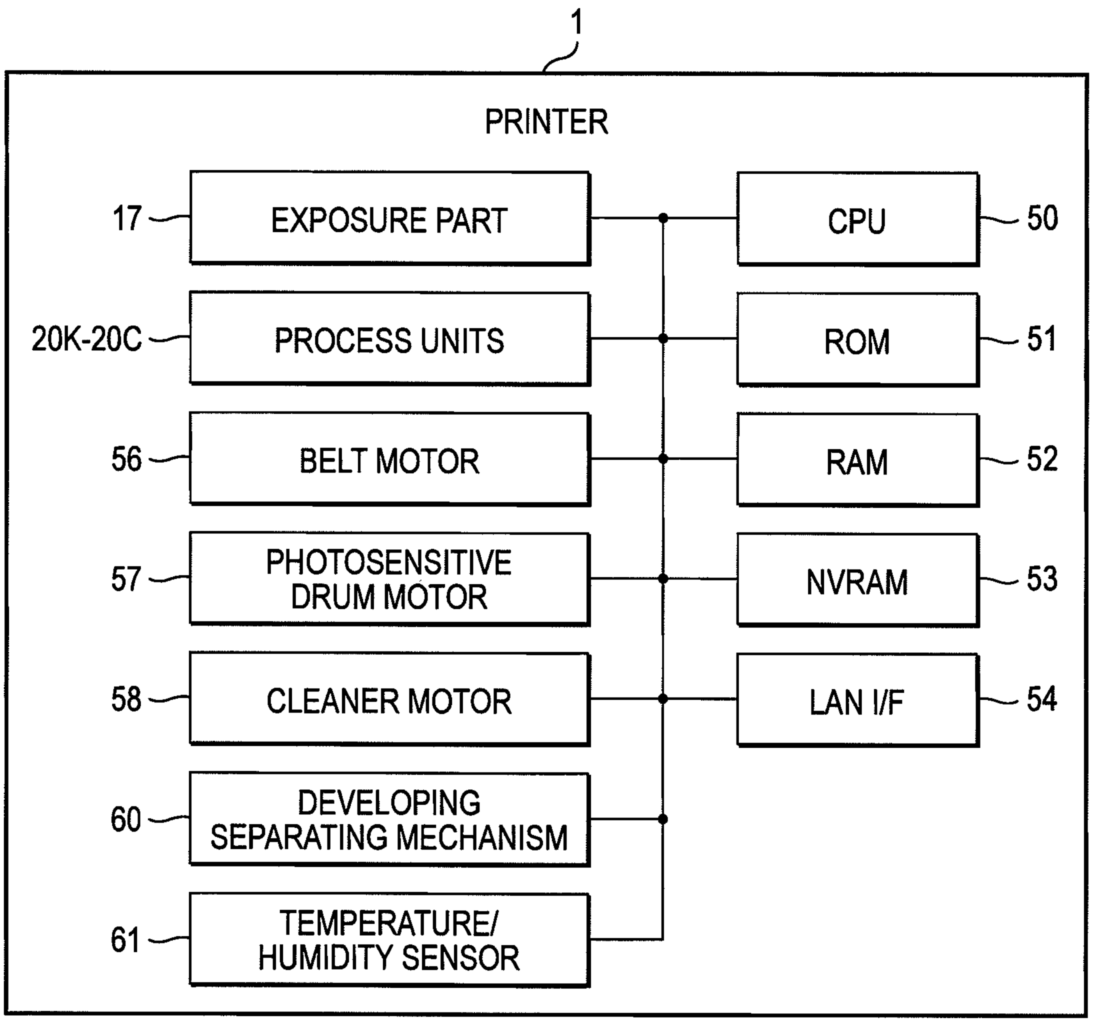
FIG. 4 is a block diagram schematically showing the electrical structure of the printer.

FIG. 4 is a block diagram schematically showing the electrical structure of the printer 1. As shown in FIG. 4, the printer 1 includes a CPU 50 (an example of a determination unit, a control unit), a ROM 51, a RAM 52, a NVRAM (nonvolatile memory) 53, and a network interface 54. The above-mentioned exposure part 17 and process units 20K to 20C are connected to these.

The ROM 51 stores programs that are used to perform various operations of the printer 1, such as motor drive start processing and motor drive stop processing to be described below. While storing the processing results thereof in the RAM 52 or the NVRAM 53, the CPU 50 controls the respective components according to the program read out from the ROM 51. The network interface 54 is connected to an external computer or the like (not shown) through a communication line, so that the network interface may make data communication with the external computer.

Further, the printer 1 includes a belt motor 56 that drives the belt drive gear 33, a photosensitive drum motor 57 that drive the photosensitive drums 25, and a cleaner motor 58 that drives the cleaning roller 34. Each of these motors 56 to 58 is, for example, a DC motor. The CPU 50 supplies PWM (Pulse Width Modulation) signals to the respective motors 56 to 58 so as to control the operations of the motors. The printer 1 further includes the developing separating mechanism 60 that displaces the developing cartridges 21 to the development position or the separation position as described above, a temperature/humidity sensor 61 (an example of a sensor) that detects temperature and humidity in the apparatus.

(Motor Drive Control)

Figure 5:
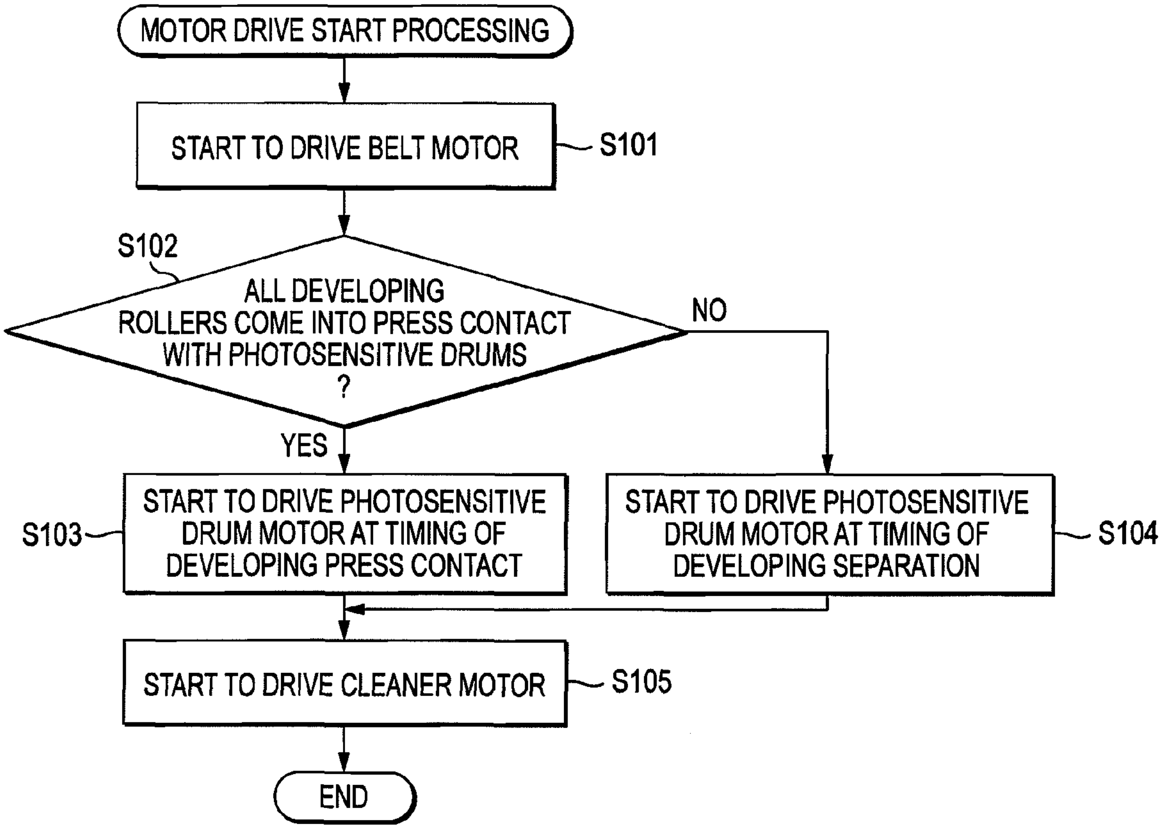
FIG. 5 is a flowchart illustrating motor drive start processing.
Figure 6:
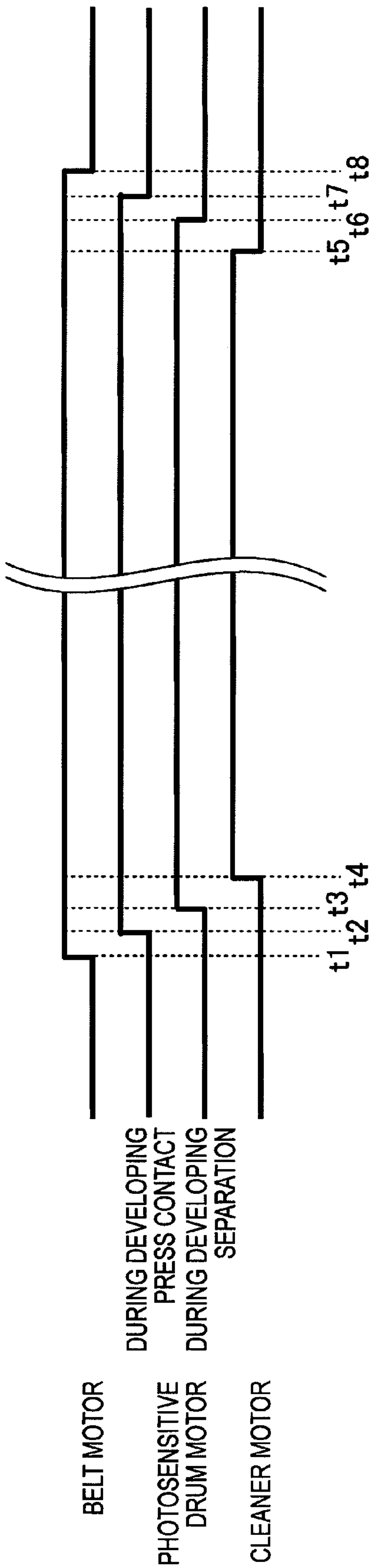
FIG. 6 is a time chart showing the drive timing of motors.

FIG. 5 is a flowchart illustrating the motor drive start processing, and FIG. 6 is a time chart showing the drive timing of the motors 56 to 58.

If the CPU 50 receives a print command, which is sent from an external computer or the like, through the network interface 54 when being in a standby state (when stopping the respective motors 56 to 58), the CPU performs print control processing according to the print command. In the print control processing, all of the developing cartridges 21 are positioned at the development position (see FIG. 1) if color printing is designated by the print command, and the developing cartridges 21 except for the black developing cartridge are positioned at the separation position (see FIG. 2) if monochromatic printing is designated by the print command. Then, the CPU 50 performs the motor drive start processing shown in FIG. 5.

First, in the motor drive start processing, the CPU 50 starts to drive the belt motor (S101) by outputting a drive signal to the belt motor 56. FIG. 6 shows the output timing of a drive signal that is output to each of the motors 56 to 58. In FIG. 6, the drive start timing of the belt motor 56 is represented by t1.

Subsequently, the CPU 50 determines whether all of the developing rollers 22 are in press contact with the photosensitive drums 25, that is, whether all of the developing cartridges 21 are positioned at the development position (S102). Further, if all of the developing rollers 22 are in press contact with the photosensitive drums 25 (Yes in S102), the CPU starts to drive the photosensitive drum motor 57 at a timing t2 of the developing press contact (S103). Furthermore, if a part of the developing rollers 22 are separated from the photosensitive drums 25 (No in S102), the CPU starts to drive the photosensitive drum motor 57 at a timing t3 of the developing separation that is later than the timing of the developing press contact (S103). After that, the CPU starts to drive the cleaner motor 58 at a timing t4 (S105), and terminates the motor drive start processing.

Figure 7:
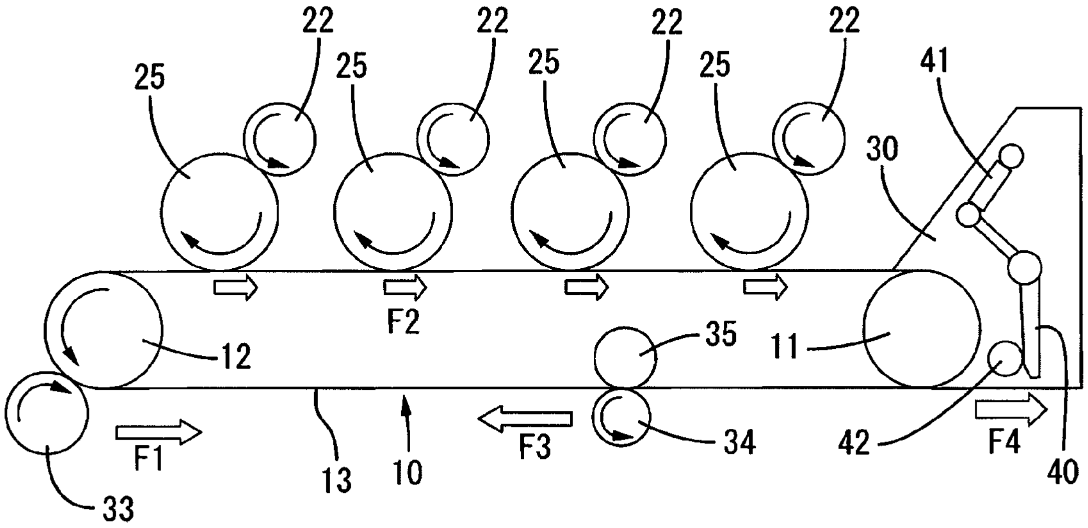
FIG. 7 is a view showing principal external forces that are applied to the belt unit in a front-and-rear direction while respective rotating bodies are driven in a normal rotation state.

Here, FIG. 7 is a view showing principal external forces that are applied to the belt unit 10 in a front-and-rear direction while the belt 13, the photosensitive drums 25, and the cleaning roller 34 are driven in a normal rotation state. As shown in FIG. 7, the external forces, which are applied to the belt unit 10 in the front-and-rear direction, include four kinds of forces, that is, a force F1 applied from the belt drive gear 33, forces F2 applied from four photosensitive drums 25, a force F3 applied from the belt cleaner 16, and a force F4 applied from the pressed part 42 through the lever 40.

As shown in FIG. 7, the belt drive gear 33 is disposed under the belt drive roller 12 in an oblique direction, therefore, a force, which is applied to the belt unit 10 (the frame 30) from the belt drive gear 33, is obliquely applied toward the lower front side. A component, which corresponds to the front-and-rear direction, of the force, which is applied to the belt unit 10

(the frame 30) from the belt drive gear 33, is the above-mentioned force F1. The force F1 is always applied toward the front side while the belt drive gear 33 is driven by the belt motor 56. Meanwhile, if the belt drive gear 33 is disposed on the belt drive roller 12 in an oblique direction, the direction of the force F1 is changed into an opposite direction. In the following description, the forward direction, that is, a direction where the protruding portion 43 of the frame 30 is pressed against the rear surface 44A of the positioning part 44 may also be referred to as a normal direction, and a direction opposite to the forward direction may also be referred to a reverse direction.

The respective photosensitive drums 25 are rotationally driven in a direction corresponding to the moving direction of the belt 13. When the belt 13 and the respective photosensitive drums 25 are in a normal rotation state in this embodiment, the moving speed of the belt 13 is higher than the outer peripheral speed of the photosensitive drum 25. Therefore, in the normal rotation state, due to the friction between the belt 13 and the respective photosensitive drums 25, the force F2 is applied to the belt 13 in a direction opposite to the moving direction of the belt, that is, in the normal direction. The magnitude or direction of the force F2 is changed by the relative speeds of the belt 13 and the photosensitive drum 25. In addition, as described below, the magnitude of the force F2 changes depending on whether or not the sheet 3 is interposed between the belt 13 and the photosensitive drums 25.

The cleaning roller 34 is rotationally driven in a direction opposite to the moving direction of the belt 13. Therefore, the force F3, which is applied to the belt unit 10 from the cleaning roller 34, is always applied in a reverse direction. The force F4, which is applied to the belt unit 10 from the pressed part 42, is always applied in a normal direction.

Figure 8:
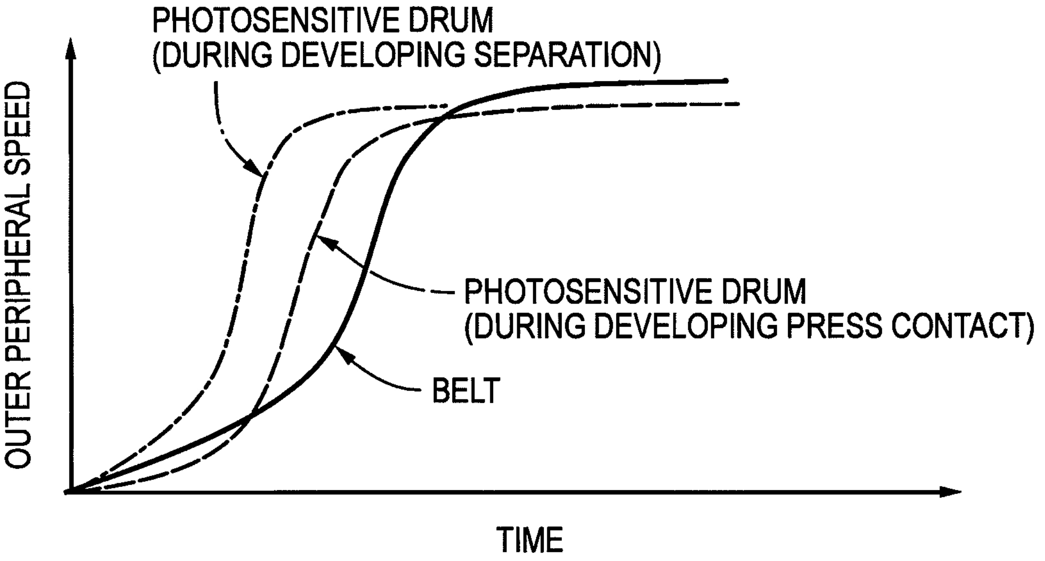
FIG. 8 is a graph showing the change in the outer peripheral speed of the photosensitive drum and the belt if it is assumed that a belt motor and a photosensitive drum motor start to be driven at the same time.
Figure 9:
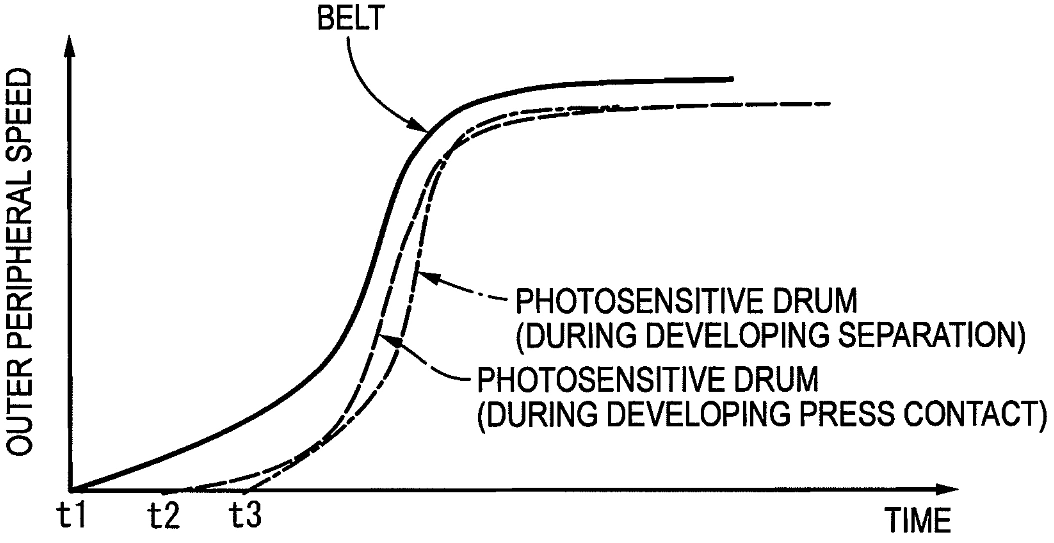
FIG. 9 is a graph showing the change in the outer peripheral speed of the photosensitive drum and the belt when the drive start timings of the photosensitive drum motor and the belt motor are delayed.

Meanwhile, FIG. 8 is a graph showing the change in the outer peripheral speed of the photosensitive drum 25 and the belt 13 if it is assumed that the belt motor 56 and the photosensitive drum motor 57 start to be driven at the same time. Further, FIG. 9 is a graph showing the change in the outer peripheral speed of the photosensitive drum 25 and the belt 13 when the drive start timings of the photosensitive drum motor 57 and the belt motor 56 are delayed.

In this embodiment, the developing roller 22 coming into press contact with the photosensitive drum 25 is rotationally driven in a direction corresponding to the rotation of the photosensitive drum 25, and the outer peripheral speed of the developing roller 22 is set to be slightly lower than that of the photosensitive drum 25 in the normal rotation state. Accordingly, when all of the developing rollers 22 are in press contact with the photosensitive drums 25 (at the timing of the developing press contact), the rotational load of the photosensitive drum 25 is increased in comparison with when a part of the developing rollers 22 are separated from the photosensitive drums 25 (at the timing of the developing separation). Therefore, as shown in FIG. 8, a rising time, which is until the photosensitive drum motor 57 reaches the normal rotation state after starting to be driven, at the time of the developing press contact is longer than that at the time of the developing separation.

Further, a rising time, which is until the belt motor 56 reaches the normal rotation state after starting to be driven, is longer than the rising time of the photosensitive drum motor 57 (at the time of developing press contact and developing separation). Therefore, if it is assumed that the belt motor 56 and the photosensitive drum motor 57 start to be driven at the same time, as shown in FIG. 8, the outer peripheral speed of the photosensitive drum 25 temporarily becomes higher than that of the moving speed of the belt 13 and then becomes lower than that of the moving speed of the belt.

If the outer peripheral speed of the photosensitive drum 25 becomes higher than the moving speed of the belt 13, the force F2, which is applied to the belt 13 from the photosensitive drum 25, is applied in the reverse direction. In addition, if it is assumed that the belt motor 56, the photosensitive drum motor 57, and the cleaner motor 58 start to be driven at the same time, the force F3 is further applied to the belt unit 10 in the reverse direction. If the magnitude of a component, which corresponds to the normal direction, of a resultant force of the forces F1, F2, and F3, which are applied to the belt unit 10 from the respective rotating bodies (the belt drive gear 33, the photosensitive drums 25, and the cleaning roller 34) as described above, is reduced or the resultant force is applied in the reverse direction, there is a possibility that the positioning state of the belt unit 10 becomes unstable.

In this embodiment, the photosensitive drum motor 57 starts to be driven after the belt motor 56 starts to be driven as shown in FIG. 9, so that the outer peripheral speed of the photosensitive drum 25 is always higher than the moving speed of the belt 13. Accordingly, the force F2, which is applied to the belt unit 10 from the photosensitive drum 25, is always applied in the normal direction.

Meanwhile, there is a concern that the surface of the photosensitive drum 25 or the belt 13 is abraded due to the rubbing between the belt and the photosensitive drum to the extent of the difference between the relative speeds of the belt 13 and the photosensitive drum 25. Therefore, the timing t2 of the developing press contact is set to be earlier than the drive start timing t3 of the developing separation so that the difference between the relative speeds is not more than predetermined speed.

In addition, as shown in FIG. 6, the drive start timing t4 of the cleaner motor 58 is later than the drive start timing t1 of the belt motor 56 and the drive start timings t2 and t3 of the photosensitive drum motor 57. Accordingly, a time where the force F3 is applied in the reverse direction by the cleaning roller 34 is later than a time where the other forces F1 and F2 are applied. Therefore, it may be possible to maintain a large resultant force of the forces F1, F2, and F3, which are applied to the belt unit 10 from the respective rotating bodies 33, 25, and 34, in the normal direction, and to stabilize the positioning of the belt unit 10.

In this way, the CPU 50 makes each of the rotating bodies 33, 25, and 34 move to the normal rotation state from a stopped state.

Figure 10:
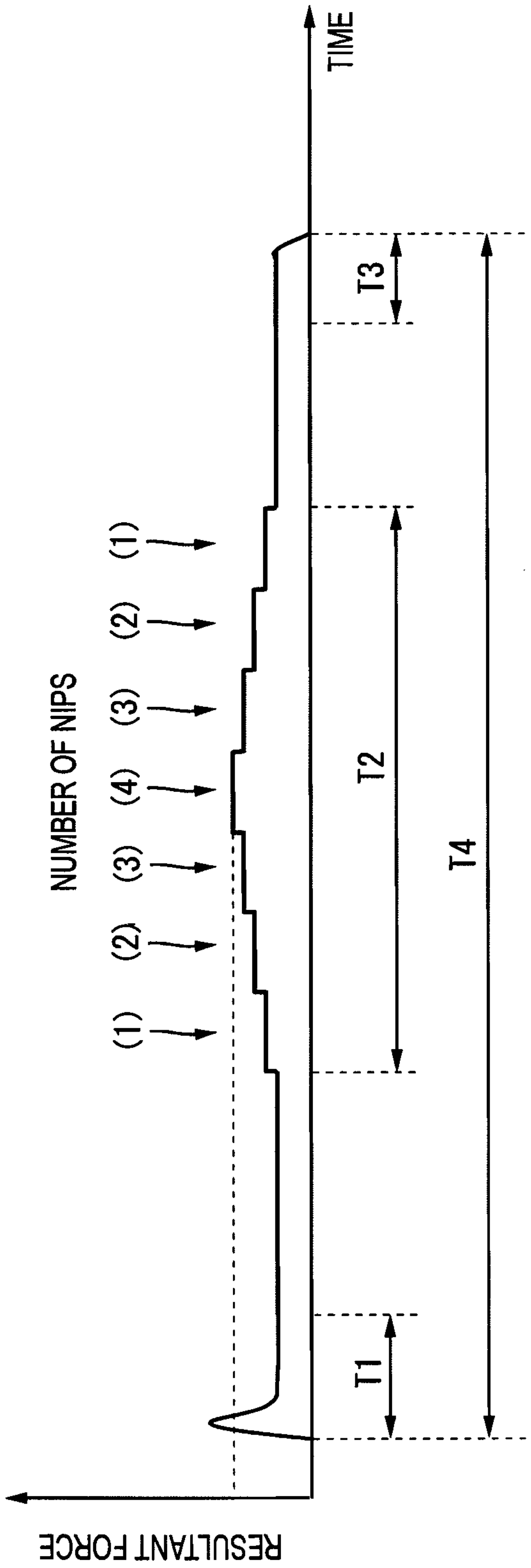
FIG. 10 is a graph showing the magnitude of a resultant force of forces that are applied to the belt unit from each of the rotating bodies.

Here, FIG. 10 is a graph showing the magnitude of a resultant force of the forces F1, F2, and F3 that are applied to the belt unit 10 from each of the rotating bodies 33, 25, and 34. As shown in FIG. 10, the magnitude of a component, which corresponds to the normal direction, of the resultant force of the forces F1, F2, and F3 is at the maximum value in a period T1 where the respective rotating bodies 33, 25, and 34 move to the normal rotation state from the stopped state. When the printer 1 receives impact from the outside before starting to be driven and the belt unit 10 is deviated in the reverse direction, that is, when the belt unit 10 is not positioned at a regular position for any reason, it is highly possible that the belt unit 10 is moved to the regular position before the start of image formation by the resultant force if the magnitude of the component, which corresponds to the normal direction, of the resultant force is at the maximum value. Accordingly, it may be possible to increase the possibility of maintaining the positional accuracy during the image formation.

Subsequently, the CPU 50 feeds the sheet 3 from the feed tray 4 by the feed roller 5. The CPU sends print data, which is based on a print command, to each of the exposure parts 17, and sequentially transfers images to the sheet 3, which is conveyed on the belt 13, from the respective photosensitive drums 25 by the above-mentioned image forming process.

Here, since the surface of the belt 13 is processed into a mirror surface, the coefficient of friction of the belt is smaller than that of the sheet 3. Further, since the sheet 3 is electrostatically attracted to the belt 13, slipping does hardly occur. Therefore, when the sheet 3 reaches a nip position between the photosensitive drum 25 and the transfer roller 14, a force applied to the belt 13 from the photosensitive drum 25 is increased. As shown in FIG. 10, the forces F2 applied to the belt unit 10 from the four photosensitive drums 25 are increased as the number of nips of the sheet 3 formed by the photosensitive drums 25 is increased. When the sheet 3 is nipped by the four photosensitive drums 25, the forces applied to the belt unit from the four photosensitive drums is at the maximum. Meanwhile, when the sheet 3 is nipped by the four photosensitive drums 25, the magnitude of the resultant force is smaller than the maximum value of the resultant force in the above-mentioned period T1.

The CPU 50 controls the rotating bodies so that a resultant force of the forces F1, F2, and F3 applied from the rotating bodies 33, 25, and 34 is always applied in the normal direction even in a period T2 where the respective rotating bodies 33, 25, and 34 are made to be in the normal rotation state and images are transferred to the sheet 3 on the belt 13. That is, in the normal rotation state, the CPU maintains the relationship of "(magnitude of F1)+(magnitude of F2)>(magnitude of F3)".

Figure 11:
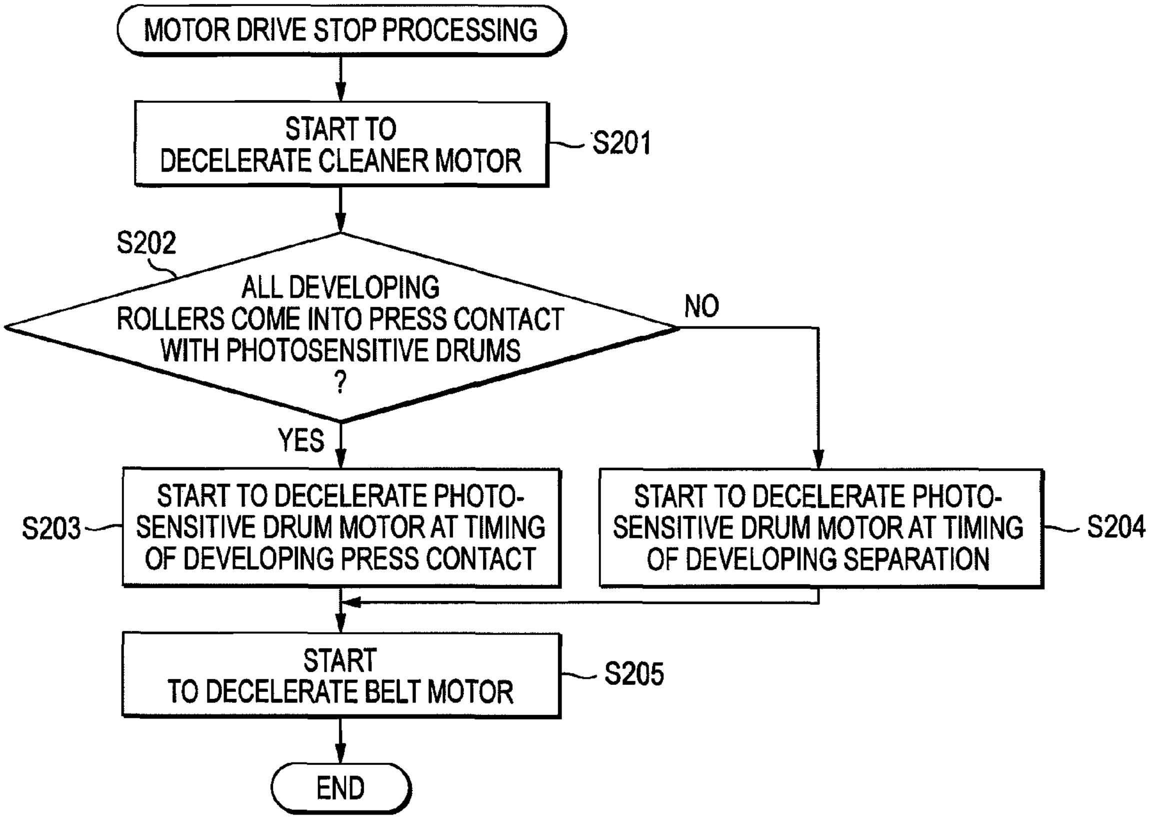
FIG. 11 is a flowchart illustrating motor drive stop processing.

FIG. 11 is a flowchart illustrating the motor drive stop processing.

The CPU 50 performs the motor drive stop processing shown in FIG. 11 after the printing on the sheet 3 is terminated.

In the motor drive stop processing, first, the CPU sends a signal, which commands the stopping of the drive of the cleaner motor, to the cleaner motor 58 at a timing t5 of drive stop (see FIG. 6) (S201). The belt motor 56 receives the signal and starts to be decelerated. Subsequently, if a part of the developing rollers 22 are separated from the photosensitive drums 25 (No in S202), the CPU starts to decelerate the photosensitive drum motor 57 at a timing t6 of the developing separation (S203). Further, if all of the developing rollers 22 are in press contact with the photosensitive drums 25 (Yes in S202), the CPU starts to decelerate the photosensitive drum motor 57 at a timing t7 of the developing press contact (S204). After that, the CPU starts to decelerate the belt motor 56 at a timing t8 (S205), and terminates the motor drive stop processing.

When the CPU is to stop the drive of the respective rotating bodies 33, 25, and 34 as described above, the CPU starts to decelerate the motors in the order reverse to an order at the time of the starting of the drive, that is, starts to decelerate the cleaner motor 58, the photosensitive drum motor 57, and the belt motor 56 in this order. If the cleaner motor 58 starts to be decelerated before the belt motor 56 and the photosensitive drum motor 57 start to be decelerated, the forces F1 and F2 in the normal direction start to be reduced after the force F3 applied from the cleaning roller 34 in the reverse direction starts to be reduced. Accordingly, it may be possible to stabilize the positioning of the belt unit 10.

Further, the photosensitive drum motor 57 starts to be decelerated before the belt motor 56 starts to be decelerated so that the moving speed of the belt 13 is always equal to or higher than the outer peripheral speed of the photosensitive drum 25. Accordingly, until the photosensitive drums 25 and the belt 13 have completely stopped, the forces F2 applied to the belt unit 10 from the photosensitive drums 25 are always applied in the normal direction.

As described above, the CPU 50 controls the rotating bodies so that a resultant force of the forces applied from the respective rotating bodies 33, 25, and 34 is always applied in the normal direction in a period T3 (see FIG. 10), which is until the respective rotating bodies 33, 25, and 34 have completed stopped after starting to be driven.

The CPU 50 controls the rotating bodies so that a resultant force of the forces applied from the respective rotating bodies 33, 25, and 34 is always applied in the normal direction except for the moment of starting of the drive of the belt motor 56 and the moment of the complete stopping of the belt motor 56 in a period T4, which is until the respective rotating bodies 33, 25, and 34 have completed stopped after starting to be driven and being made to be in a normal rotation state as shown in FIG. 10.

Accordingly, when the printer 1 receives impact or vibration from the outside, the belt unit 10 is prevented from being moved from a regular position in the reverse direction.

(Advantages of this Embodiment)

As described above, according to this embodiment, the rotating bodies are controlled so that a resultant force of the forces applied to the belt unit 10 from the plurality of rotating bodies 33, 25, and 34 is always applied in the normal direction where the frame 30 is abutted against the positioning part 44, in a period T1 where the plurality of rotating bodies (the belt drive gear 33, the photosensitive drums 25, and the cleaning roller 34) moves to the normal rotation state from the stopped state. Accordingly, the positioning of the belt unit 10 is stable, and it may be possible to ensure the quality of images to be formed.

Further, when the plurality of rotating bodies 33, 25, and 34 moves to the normal rotation state from the stopped state, the drive start timing of at least one of the rotating bodies 33, 25, and 34 is made to be different from those of the other rotating bodies 33, 25, and 34. If the plurality of rotating bodies 33, 25, and 34 is driven at the same time, it may be difficult to control the rotating bodies to make the direction of a resultant force be constant due to the difference in the rising time of the respective rotating bodies 33, 25, and 34. However, it may be possible to easily achieve the above-mentioned control by delaying the drive start timings of the rotating bodies 33, 25, and 34.

Furthermore, the plurality of rotating bodies 33, 25, and 34 includes the normal rotating body (the belt drive gear 33) that applies a force to the belt unit 10 in the normal direction, and the reverse rotating body (the cleaning roller 34) that applies a force to the belt unit in the reverse direction. Accordingly, when the respective rotating bodies 33, 25, and 34 move to the normal rotation state from the stopped state, at least one normal rotating body 33 starts to be driven before the reverse rotating body 34 starts to be driven. Accordingly, when the respective rotating bodies 33, 25, and 34 start to be driven, a force starts to be applied to the belt unit in the reverse direction after a force starts to be applied to the belt unit 10 in the normal direction. As a result, it may be possible to stabilize the positioning of the belt unit 10.

Moreover, the change state of the rotational load of the developing roller 22 is determined on the basis of the contact/separation state of the developing roller 22, and the drive start timing or the deceleration start timing is controlled according to the change state. That is, the response time at the time of the starting of the drive or deceleration is changed due to the change of the rotational load applied to the photosensitive drum 25. Accordingly, if timing is controlled according to the change, it may be possible to stabilize positioning regardless of the change state of the rotational load.

Further, the belt and the photosensitive drums are always controlled so that the magnitude relationship between the relative speeds of the belt 13 and the photosensitive drums 25 rotated in a direction corresponding to the moving direction of the belt 13 is not reversed. That is, if the magnitude relationship between the relative speeds of the belt 13 and the photosensitive drum 25 is reversed at the time of the starting of the drive or deceleration, the direction of the force applied to the belt 13 from the photosensitive drum 25 is reversed. Therefore, there is a possibility that the positioning of the belt unit 10 becomes unstable. In contrast, if the belt and the rotating body are always controlled so that the magnitude relationship between the relative speeds of the belt 13 and the photosensitive drum is not reversed, it may be possible to stabilize the positioning of the belt unit 10.

Furthermore, the rotating bodies are controlled so that a resultant force of the forces applied to the belt unit 10 from the plurality of rotating bodies 33, 25, and 34 is always applied in the normal direction where the frame 30 is abutted against the positioning part 44, in the period T2 where the plurality of rotating bodies 33, 25, and 34 is made to be in the normal rotation state and images are carried on the belt 13 (indirectly through the sheet 3). Accordingly, the positioning of the belt unit 10 is stable, and it may be possible to ensure the quality of images to be formed.

Moreover, the rotating bodies are controlled so that a resultant force of the forces applied to the belt unit 10 from the respective rotating bodies 33, 25, and 34 is always applied in the normal direction and the magnitude of a component of the resultant force corresponding to the normal direction reaches the maximum value before the images are carried on the belt 13 in the period T4, which is until the plurality of rotating bodies 33, 25, and 34 have completed stopped after the plurality of rotating bodies 33, 25, and 34 moves to the normal rotation state from the stopped state and images are carried on the belt 13. Accordingly, even when the belt unit 10 is not positioned at a regular position for any reason before carrying the images, the belt unit receives large forces applied from the respective rotating bodies 33, 25, and 34 in the normal direction, so that it is highly possible that the belt unit 10 is moved in the normal direction and positioned at the regular position. As a result, it may be possible to ensure the quality of images to be formed.

In addition, the image forming apparatus includes the lever push spring 41 that pushes the frame 30 of the belt unit 10 in the normal direction. Accordingly, it may be possible to more reliably position the belt unit 10. Since the rotating bodies are controlled so that a resultant force of the forces applied from the plurality of rotating bodies 33, 25, and 34 is applied in the normal direction, it may be possible to reliably position the belt unit 10 even with a small pushing force. Therefore, it may be possible to reduce the size of the part, such as the lever push spring 41 or the lever 40, or to simplify the part.

Other Embodiments

The invention is not limited to the embodiment that has been described with reference to the drawings. For example, the following embodiments are also included in the scope of the invention.

(1) In the above-mentioned embodiment, the invention has been applied to a direct transfer tandem color printer. However, the invention is not limited thereto, and may be applied to another image forming apparatus, for example, an intermediate transfer image forming apparatus, a 4-cycle image forming apparatus, or an inkjet image forming apparatus. Further, the invention may be applied to not only a color image forming apparatus but also a monochrome image forming apparatus.

Furthermore, the invention may be applied to an image forming apparatus including an intermediate transfer belt unit that is provided with an intermediate transfer belt as an image carrier or a unit that is provided with other rollers or a photosensitive drum as an image carrier.

(2) According to the invention, the number of the plurality of rotating bodies, which applies forces to the image carrier unit, may be two or 4 or more.

(3) In the above-mentioned embodiment, each of the rotating bodies has been driven by a DC motor. However, according to the invention, the driving state of each of the rotating bodies may be controlled by using another type of drive unit such as a stepping motor.

(4) In the above-mentioned embodiment, the change state of the rotational load of the photosensitive drum has been determined on the basis of the contact/separation state of the developing roller and the drive start timing or the deceleration start timing has been controlled according to the change state. However, according to the invention, for example, a change in the environment, such as temperature or humidity, may be detected by the temperature/humidity sensor 61, the change state of the rotational load of the rotating body (the change of the frictional force on the surface of the rotating body) caused by the change of environment may be determined, and the drive start timing or the deceleration start timing may be controlled according to the determination.

(5) In the above-mentioned embodiment, the belt unit has been pushed by the pushing force of the lever push spring. However, according to the invention, a pushing unit for pushing a support may not be particularly provided.

(6) In the above-mentioned embodiment, the belt unit has been positioned in the forward direction by the positioning part. However, according to the invention, the image carrier unit may be positioned in a backward direction and may be positioned on the upper or lower sides in an oblique direction.

According to a first aspect of the present invention, there is provided an image forming apparatus comprising: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body, are rotationally driven independently of each other, and apply forces to the image carrier unit, the forces being based on rotations of the rotating bodies; and a control unit that controls driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies moves to a normal rotation state from a stopped state.

According to the first aspect of the present invention, the rotating bodies are controlled so that a resultant force of the forces applied to the image carrier unit from the plurality of rotating bodies is always applied in the normal direction where the support is abutted against the positioning part, in a period where the plurality of rotating bodies moves to a normal rotation state from a stopped state. Accordingly, the positioning of the image carrier unit is stable, and it may be possible to ensure the quality of images to be formed.

According to a second aspect of the present invention, in addition to the first aspect, when the plurality of rotating bodies move to the normal rotation state from the stopped state, the control unit makes a drive start timing of at least one of the plurality of rotating bodies be different from those of the other rotating bodies.

According to the second aspect of the present invention, when the plurality of rotating bodies move to a normal rotation state from a stopped state, the drive start timing of at least one rotating body is made to be different from those of the other rotating bodies. If the plurality of rotating bodies is driven at the same time, it may be difficult to control the rotating bodies to make the direction of the resultant force be constant due to the difference in the rising time of the respective rotating bodies. However, it may be possible to easily achieve the above-mentioned control by delaying the drive start timings of the rotating bodies.

According to a third aspect of the present invention, in addition to the second aspect, the plurality of rotating bodies includes a normal rotating body that applies a force to the image carrier unit in the normal direction where the support member is abutted against the positioning part, and a reverse rotating body that applies a force to the image carrier unit in a direction opposite to the normal direction, and when the plurality of rotating bodies move to the normal rotation state from the stopped state, the control unit makes the drive start timing of at least one normal rotating body be prior to the drive start timing of the reverse rotating body.

According to the third aspect, the plurality of rotating bodies includes a normal rotating body that applies a force to the image carrier unit in the normal direction, and a reverse rotating body that applies a force to the image carrier unit in a direction opposite to the normal direction. When the respective rotating bodies move to a normal rotation state from a stopped state, at least one the normal rotating body starts to be driven before the reverse rotating body starts to be driven. Accordingly, when the respective rotating bodies start to be driven, a force starts to be applied to the image carrier unit in the reverse direction after a force starts to be applied to the image carrier unit in the normal direction. As a result, it may be possible to stabilize the positioning of the image carrier unit.

According to a fourth aspect of the present invention, there is provided an image forming apparatus comprising: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body, are rotationally driven independently of each other, and apply forces to the image carrier unit, the forces being based on rotations of the rotating bodies; and a control unit that controls driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies move to a stopped state from a normal rotation state.

According to the fourth aspect, the rotating bodies are controlled so that a resultant force of forces applied to the image carrier unit from the plurality of rotating bodies is always applied in a normal direction where the support is abutted against the positioning part, in a period where the plurality of rotating bodies moves to a stopped state from a normal rotation state. Accordingly, the positioning of the image carrier unit is stable, and it may be possible to ensure the quality of images.

According to a fifth aspect of the present invention, in addition to the fourth aspect, when the plurality of rotating bodies move to the stopped state from the normal rotation state, the control unit makes the deceleration start timing of at least one of the plurality of rotating bodies be different from those of the other rotating bodies.

According to the fifth aspect, when the plurality of rotating bodies move to a stopped state from a normal rotation state, the control unit makes the deceleration start timing of at least one of the plurality of rotating bodies be different from those of the other rotating bodies. If the plurality of rotating bodies is decelerated at the same time, it may be difficult to control the rotating bodies to make the direction of the resultant force be constant due to the difference in time required to decelerate the respective rotating bodies. However, it may be possible to easily achieve the above-mentioned control by delaying the deceleration start timings of the rotating bodies.

According to a sixth aspect of the present invention, in addition to the fifth aspect, the plurality of rotating bodies includes a normal rotating body that applies a force to the image carrier unit in the normal direction where the support member is abutted against the positioning part, and a reverse rotating body that applies a force to the image carrier unit in a direction opposite to the normal direction, and when the plurality of rotating bodies move to the stopped state from the normal rotation state, the control unit makes the deceleration start timing of at least one reverse rotating body be prior to the deceleration start timing of the normal rotating body.

According to the sixth aspect, the plurality of rotating bodies includes a normal rotating body that applies a force to the image carrier unit in the normal direction, and a reverse rotating body that applies a force to the image carrier unit in a reverse direction. When the plurality of rotating bodies moves to a stopped state from a normal rotation state, at least one reverse rotating body starts to be decelerated before the normal rotating body starts to be decelerated. Accordingly, when the respective rotating bodies are decelerated, a force applied in the normal direction starts to be reduced after a force applied to the image carrier unit in the reverse direction starts to be reduced. As a result, it may be possible to stabilize the positioning of the image carrier unit.

According to a seventh aspect of the present invention, in addition to any one of the second, third, fifth and sixth aspect of the present invention, the image forming apparatus further comprising: a determination unit that determines a change state of a rotational load of at least one rotating body of the plurality of rotating bodies, wherein the control unit controls the timing in accordance with the change state of the rotational load that is determined by the determination unit.

According to the seventh aspect, the drive start timing or the deceleration start timing is controlled according to the change state of the rotational load of the rotating body. That is, the response time at the time of the starting of the drive or deceleration is changed due to the change of the rotational load applied to the rotating body. Accordingly, timing is controlled according to the change, so that it may be possible to stabilize positioning regardless of the change state of the rotational load.

According to an eighth aspect of the present invention, in addition to the seventh aspect, the image forming apparatus, further comprising: a movable member that is configured to be in contact with and be separated from the rotating body, which is an object to be determined by the determination unit, wherein the determination unit determines the change state of the rotational load based on the contact or separation state of the movable member.

According to the eighth aspect of the present invention, the change state of the rotational load is determined on the basis of the contact/separation state of the movable member that comes into contact with and is separated from the rotating body. That is, the operation of the rotating body at the time of the starting of the drive or deceleration is changed due to the change state of the rotational load applied to the rotating body that is caused by the contact and separation of the movable member. Accordingly, timing is controlled according to the change, so that it may be possible to stabilize positioning.

According to a ninth aspect of the present invention, in addition to the seventh aspect or the eighth aspect, the image forming apparatus, further comprises: a sensor that detects at least one of temperature and humidity, wherein the determination unit determines the change state of the rotational load based on a detection result of the sensor.

According to the ninth aspect, the change state of the rotational load is determined on the basis of the detection results of the sensor that detects temperature or humidity. That is, the operation of the rotating body at the time of the starting of the drive or deceleration is changed and the rotational load of the rotating body is changed due to the change of temperature or humidity. Accordingly, timing is controlled according to the change, so that it may be possible to stabilize positioning.

According to an tenth aspect of the present invention, in addition to the first to ninth aspect of the present invention, the plurality of rotating bodies includes a drive gear that rotationally drives the image carrier, and parallel rotating body which is rotated in a normal rotation state in a direction corresponding to a rotational direction of the image carrier and apply force to the image carrier in the normal direction, and the control unit always controls the image carrier and the parallel rotating body in the period so that the magnitude relationship between the relative speeds of the image carrier and the parallel rotating body is not reversed.

According to the tenth aspect, the image carrier and the parallel rotating bodies are always controlled so that the magnitude relationship between the relative speeds of the image carrier and the parallel rotating body is not reversed. If the magnitude relationship between the relative speeds of the image carrier and the parallel rotating body is reversed at the time of the starting of the drive or deceleration of the rotating body, the direction of the force applied to the image carrier from the parallel rotating body is reversed. Therefore, there is a possibility that the positioning of the image carrier unit becomes unstable. In contrast, if the image carrier and the parallel rotating body are always controlled so that the magnitude relationship between the relative speeds of the image carrier and the parallel rotating body is not reversed, it may be possible to stabilize the positioning of the image carrier unit.

According to an eleventh aspect of the present invention, there is provided an image forming apparatus comprising: an apparatus body; an image carrier unit that includes: a support member; and an image carrier that is rotatably supported by the support member and directly or indirectly carries images; a positioning part that is provided at the apparatus body and positions the image carrier unit by being abutted against the support member; a plurality of rotating bodies which are provided in the apparatus body, are rotationally driven independently of each other, and apply forces to the image carrier unit, the forces being based on the rotations of the rotating bodies; and a control unit that controls the driving states of the plurality of rotating bodies, wherein the control unit controls the rotating bodies so that a resultant force of forces applied to the image carrier unit from the plurality of rotating bodies is always applied in a normal direction where the support member is abutted against the positioning part, in a period where the plurality of rotating bodies are made to be in a normal rotation state and image is carried on the image carrier.

According to the eleventh invention, the rotating bodies are controlled so that a resultant force of forces applied to the image carrier unit from the plurality of rotating bodies is always applied in a normal direction where the support is abutted against the positioning part, in a period where the plurality of rotating bodies are made to be in a normal rotation state and images are carried on the image carrier. Accordingly, the positioning of the image carrier unit is stable, and it may be possible to ensure the quality of images to be formed.

According to a twelfth aspect of the present invention, in addition to the first aspect to the eleventh aspect of the present invention, the control unit controls the rotating bodies so that a resultant force of forces applied to the image carrier unit from the plurality of rotating bodies is always applied in the normal direction and the magnitude of a component of the resultant force corresponding to the normal direction reaches a maximum value before the images are carried on the image carrier in a period, which is until the plurality of rotating bodies move to the stopped state after the plurality of rotating bodies move to the normal rotation state from the stopped state and images are carried on the image carrier.

According to the twelfth aspect, the rotating bodies are controlled so that a resultant force of forces applied to the image carrier unit from the plurality of rotating bodies is always applied in the normal direction and the magnitude of a component of the resultant force corresponding to the normal direction reaches the maximum value before the images are carried on the image carrier in a period, which is until the plurality of rotating bodies moves to a stopped state after the plurality of rotating bodies moves to a normal rotation state from a stopped state and images are carried on the image carrier. Accordingly, even when the image carrier unit is not positioned at a regular position for any reason before carrying the images, the image carrier unit receives large forces applied from the respective rotating bodies in the normal direction, so that it is highly possible that the image carrier unit is moved in the normal direction and positioned at the regular position. As a result, it may be possible to ensure the quality of images to be formed.

According to a thirteenth aspect of the present invention, in addition to the first aspect to twelfth aspect, the image forming apparatus, further comprises a pushing unit that pushes the support member in the normal direction.

According to the thirteenth aspect, the image forming apparatus further includes a pushing unit that pushes the support in the normal direction. Accordingly, it may be possible to more reliably position the image carrier unit. Further, since the rotating bodies are controlled so that a resultant force of the forces applied from the plurality of rotating bodies is applied in the normal direction, it may be possible to reliably position the image carrier unit even with a small pushing force. Therefore, it may be possible to reduce the size of the part or to simplify the part.

According to a fourteenth aspect of the present invention, in addition to any one of the first aspect to the thirteenth aspect, the image carrier is a belt that conveys a sheet, and the plurality rotating bodies includes a drive gear that drives the belt, and a photosensitive drum that transfers the formed image to the sheet on the belt.

According to a fifteenth aspect of the present invention, in addition to the fourteenth aspect of the present invention, the plurality of rotating bodies further includes a cleaning roller for cleaning the belt.

As described above, according to the illustrative aspects of the present invention, the rotating bodies are controlled so that a resultant force of the forces applied to the image carrier unit from the plurality of rotating bodies is always applied in the normal direction where the support is abutted against the positioning part, in a period where the plurality of rotating bodies moves to a normal rotation state from a stopped state, a period where the plurality of rotating bodies moves to a stopped state from a normal rotation state, or a period where the plurality of rotating bodies is made to be in a normal rotation state and images are carried on the image carrier. Accordingly, the positioning of the image carrier unit is stable, and it may be possible to ensure the quality of images to be formed.

What is claimed is:

1. An image forming apparatus comprising:

an apparatus body;

an image carrier unit that includes:

a support member; and an image carrier that is rotatably supported by the support member and directly or indirectly carries images;

a positioning part that is provided at the apparatus body and positions the image carrier unit by being abutted against the support member;

a plurality of rotating bodies which are provided in the apparatus body, are rotationally driven independently of each other, and apply forces to the image carrier unit, the forces being based on rotations of the rotating bodies; and a controller that controls driving states of the plurality of rotating bodies, wherein the controller controls the rotating bodies so that a resultant force of forces applied to the image carrier unit from the plurality of rotating bodies is always applied in a normal direction where the support member is abutted against the positioning part, in a period where the plurality of rotating bodies moves to a normal rotation state from a stopped state, and wherein the plurality of rotating bodies includes a normal rotating body, which applies a force to the image carrier unit in the normal direction where the support member is abutted against the positioning part, and a reverse rotating body, which applies a force to the image carrier unit in a direction opposite to the normal direction.

2. The image forming apparatus according to claim 1, wherein, when the plurality of rotating bodies move to the normal rotation state from the stopped state, the controller makes a drive start timing of at least one of the plurality of rotating bodies be different from those of the other rotating bodies.

3. The image forming apparatus according to claim 2, wherein, when the plurality of rotating bodies move to the normal rotation state from the stopped state, the controller makes the drive start timing of at least one normal rotating body be prior to the drive start timing of the reverse rotating body.

4. The image forming apparatus according to claim 2, wherein the controller determines a change state of a rotational load of at least one rotating body of the plurality of rotating bodies, and wherein the controller controls the timing in accordance with the change state of the rotational load.

5. The image forming apparatus according to claim 4, further comprising:

a movable member that is configured to be in contact with and be separated from the rotating body, which is an object to be determined by the controller, wherein the controller determines the change state of the rotational load based on the contact or separation state of the movable member.

6. The image forming apparatus according to claim 4, further comprising:

a sensor that detects at least one of temperature and humidity, wherein the controller determines the change state of the rotational load based on a detection result of the sensor.

7. The image forming apparatus according to claim 1, wherein the plurality of rotating bodies includes a drive gear, which rotationally drives the image carrier, and a parallel rotating body, which is rotated in a normal rotation state in a direction corresponding to a rotational direction of the image carrier and applies force to the image carrier in the normal direction, and wherein the controller controls the image carrier and the parallel rotating body in the period so that a magnitude relationship between a relative speed of the image carrier and the parallel rotating body is not reversed.

8. The image forming apparatus according to claim 1, wherein the controller controls the rotating bodies so that the resultant force of forces applied to the image carrier unit from the plurality of rotating bodies is applied in the normal direction and the magnitude of a component of the resultant force corresponding to the normal direction reaches a maximum value before the images are carried on the image carrier in a period, which is until the plurality of rotating bodies move to the stopped state after the plurality of rotating bodies move to the normal rotation state from the stopped state and images are carried on the image carrier.

9. The image forming apparatus according to claim 1, further comprising:

a pushing unit that pushes the support member in the normal direction.

10. The image forming apparatus according to claim 1, wherein the image carrier is a belt that conveys a sheet, and the plurality rotating bodies includes a drive gear that drives the belt, and a photosensitive drum that transfers the formed image to the sheet on the belt.

11. The image forming apparatus according to claim 10, wherein the plurality of rotating bodies further includes a cleaning roller for cleaning the belt.

12. An image forming apparatus comprising:

an apparatus body;

an image carrier unit that includes:

a support member; and an image carrier that is rotatably supported by the support member and directly or indirectly carries images;

a positioning part that is provided at the apparatus body and positions the image carrier unit by being abutted against the support member;

a plurality of rotating bodies which are provided in the apparatus body, are rotationally driven independently of each other, and apply forces to the image carrier unit, the forces being based on rotations of the rotating bodies; and a controller that controls driving states of the plurality of rotating bodies, wherein the controller controls the rotating bodies so that a resultant force of forces applied to the image carrier unit from the plurality of rotating bodies is applied in a normal direction where the support member is abutted against the positioning part, in a period where the plurality of rotating bodies move to a stopped state from a normal rotation state, and wherein the plurality of rotating bodies includes a normal rotating body, which applies a force to the image carrier unit in the normal direction where the support member is abutted against the positioning part, and a reverse rotating body, which applies a force to the image carrier unit in a direction opposite to the normal direction.

13. The image forming apparatus according to claim 12, wherein, when the plurality of rotating bodies move to the stopped state from the normal rotation state, the controller makes the deceleration start timing of at least one of the plurality of rotating bodies be different from those of the other rotating bodies.

14. The image forming apparatus according to claim 13, wherein, when the plurality of rotating bodies move to the stopped state from the normal rotation state, the controller makes the deceleration start timing of at least one reverse rotating body be prior to the deceleration start timing of the normal rotating body.

15. The image forming apparatus according to claim 12, wherein the plurality of rotating bodies includes a drive gear, which rotationally drives the image carrier, and a parallel rotating body, which is rotated in a normal rotation state in a direction corresponding to a rotational direction of the image carrier and applies force to the image carrier in the normal direction, and wherein the controller controls the image carrier and the parallel rotating body in the period so that a magnitude relationship between a relative speed of the image carrier and the parallel rotating body is not reversed.

16. An image forming apparatus comprising:

an apparatus body;

an image carrier unit that includes:

a support member; and an image carrier that is rotatably supported by the support member and directly or indirectly carries images;

a positioning part that is provided at the apparatus body and positions the image carrier unit by being abutted against the support member;

a plurality of rotating bodies which are provided in the apparatus body, are rotationally driven independently of each other, and apply forces to the image carrier unit, the forces being based on the rotations of the rotating bodies; and a controller that controls the driving states of the plurality of rotating bodies, wherein the controller controls the rotating bodies so that a resultant force of forces applied to the image carrier unit from the plurality of rotating bodies is applied in a normal direction where the support member is abutted against the positioning part, in a period where the plurality of rotating bodies are made to be in a normal rotation state and image is carried on the image carrier, and wherein the plurality of rotating bodies includes a normal rotating body that applies a force to the image carrier unit in the normal direction where the support member is abutted against the positioning part, and a reverse rotating body that applies a force to the image carrier unit in a direction opposite to the normal direction.

17. The image forming apparatus according to claim 16, wherein the plurality of rotating bodies includes a drive gear, which rotationally drives the image carrier, and a parallel rotating body, which is rotated in a normal rotation state in a direction corresponding to a rotational direction of the image carrier and applies force to the image carrier in the normal direction, and wherein the controller controls the image carrier and the parallel rotating body in the period so that a magnitude relationship between a relative speed of the image carrier and the parallel rotating body is not reversed.

* * * * *